Aug. 24, 1954     C. GRUNSKY ET AL     2,687,324
PIPE PULLER
Filed Aug. 13, 1951     2 Sheets-Sheet 1
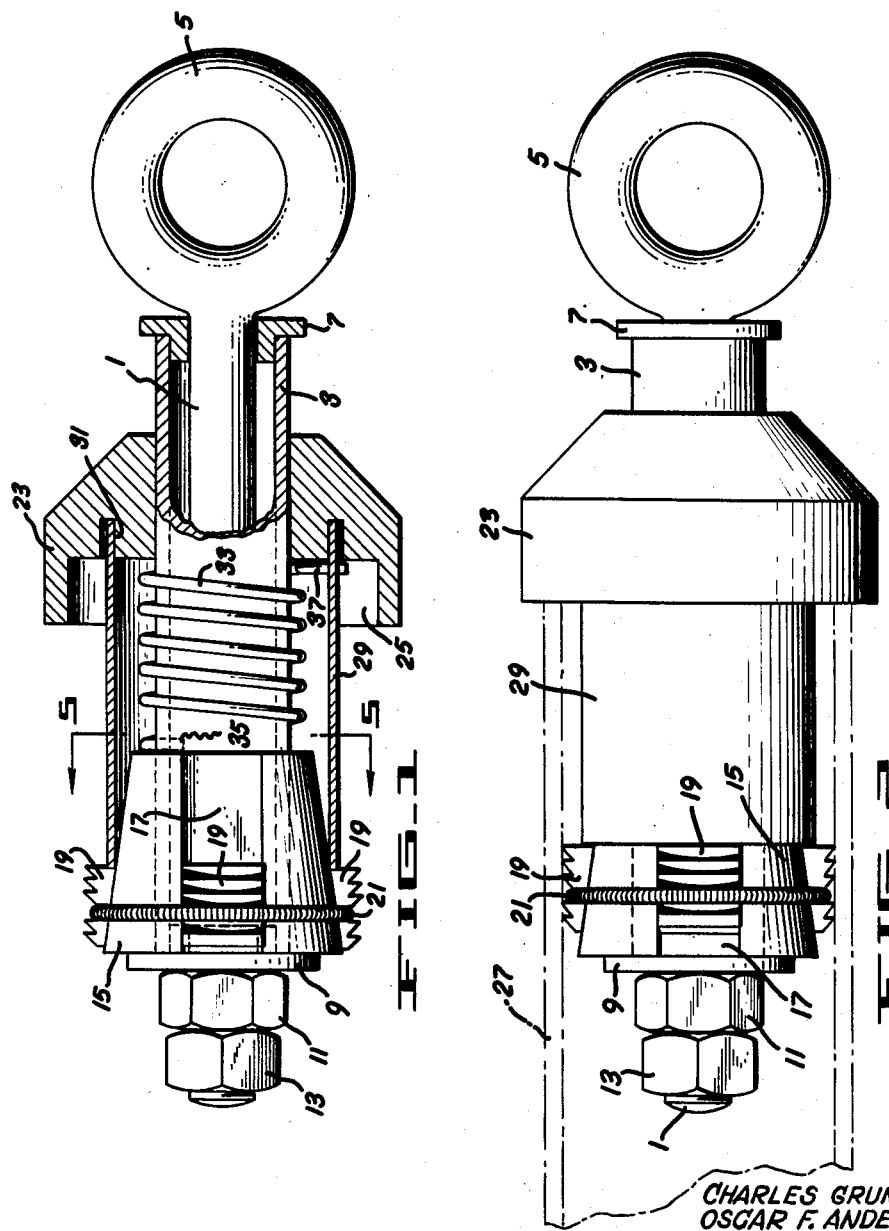
CHARLES GRUNSKY &
OSCAR F. ANDERSON
INVENTORS
BY
*Lippincott & Smith*
ATTORNEYS Aug. 24, 1954

C. GRUNSKY ET AL 2,687,324

PIPE PULLER

Filed Aug. 13, 1951

CHARLES GRUNSKY &
OSCAR F. ANDERSON
INVENTORS

BY
Lippincott & Smith
ATTORNEYS

Patented Aug. 24, 1954

2,687,324

UNITED STATES PATENT OFFICE 2,687,324

PIPE PULLER

Charles Grunsky, San Francisco, and Oscar F. Anderson, Watsonville, Calif.

Application August 13, 1951, Serial No. 241,544

3 Claims. (Cl. 294—96)

This invention relates to an improvement in pipe pullers, and more particularly to a pipe puller suitable for engaging threaded or flanged pipes, as well as plain-ended pipes.

In the construction and maintenance of pipe lines it is often necessary to insert a section of pipe through a previously prepared bore or conduit as, for example, in the case of a gas line which passes under a paved highway. Heretofore it has been necessary, in accomplishing the foregoing, to fasten a cable by welding or bolting it to that section of pipe to be placed under the highway. The cable is then extended through the conduit and the pipe section is accordingly dragged into place. Obviously, considerable time, as well as equipment, is required in the attaching and the removing of the cable.

The present invention provides a pipe puller having a plurality of gripping members capable of engaging the inner surface of a pipe which it is desired to move. This permits pipe movement by the pulling device without necessitating any welding, bolting or other form of general rigid attachment to the pipe. Essentially, the invention comprises a fixed element against which the end of the pipe to be moved is adapted to abut. The fixed element is arranged to protrude for a short distance within the end of the abutting pipe. A rigid member is supported within the fixed member so as to be capable of movement relative thereto. A tapered member is secured to that end of the rigid member which fits within the pipe. This tapered member is so secured that its apex faces toward the end of the pipe and abuts the fixed element. Supported about the tapered element are a plurality of gripping dogs which are held at all times tightly to the surface thereof. The dogs are continually maintained in abutting engagement with the end of the fixed element which protrudes within the pipe. A resilient element is arranged to draw the tapered element within the fixed element in such a way that the abutting engagement between the gripping elements and the fixed element forces the gripping elements outwardly relative to the tapered member in a radial direction to establish contact with the inner wall of the pipe to be moved.

Removal of the pipe puller from the pipe is accomplished by merely moving the rigid member, and with it the tapered member, in a direction such that the two members are carried inwardly of the pipe to be moved, thereby allowing the gripping members to be biased radially inwardly toward the axis of the tapered member by further biasing means. The gripping action is thus released and the pipe puller may then be extracted from the pipe while so held.

Accordingly, an object of this invention is the provision of a practical pipe puller capable of securely gripping a pipe, yet readily admitting of attachment to and removal from the pipe.

It is a further object of this invention to provide a pipe puller capable of engaging the internal surface of a pipe, thereby having a diameter substantially equal to that of the pipe.

Another object of this invention is the provision of a pipe puller which has a pipe gripping force which becomes greater the greater the force applied to the moving member, which in the illustrated form is the handle element.

A still further object of this invention is the provision of a pipe puller which is extremely rugged in construction, yet economical in manufacture, and which, at the same time, includes relatively few parts and no components easily apt to cause trouble in long, hard use.

Other and further objects of the present invention will be apparent from a reading of the following detailed description taken in conjunction with the accompanying drawings wherein:

Fig. 1 is a view partly in cross-section and partly in side elevation, showing representative structure for a pipe puller made in accordance with the present invention;

Fig. 2 is a view in side elevation of the pipe puller of Fig. 1 as applied to a pipe section, with the fixed member thereof being displaced, in the illustrated embodiment, to the right relative to the rigid member to show a further position of the gripping dogs on the tapered member for accommodating pipes of less than maximum diameter;

Figure 3:
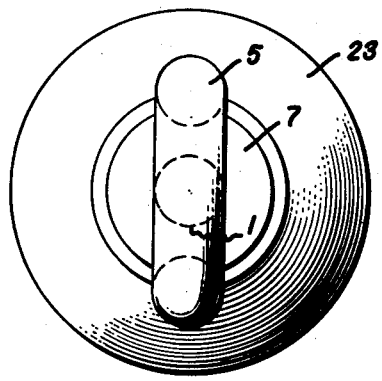
Figs. 3 and 4 show respectively proximal and distal end views of the pipe puller of Fig. 1.
Figure 4:
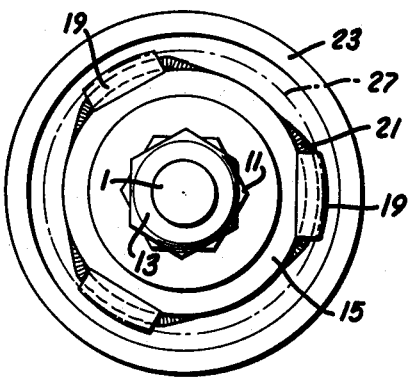

Referring to the drawings, and particularly to Figs. 1 and 2, an eye bolt 1 extends longitudinally of a rigid stem 3 to leave the eye handle 5 (Figs. 1 and 3) protruding from the proximal end of this stem. A proximal cap 7, preferably force-fitted into stem 3, provides a support for the handle end of bolt 1. The distal end of stem 3 is likewise provided with a cap 9 which supports the opposite end of bolt 1. The bolt 1 is secured in place against the cap 9 by any suitable means, such as the nut 11, to which may be added, if desired, a second locking nut 13 to prevent loosening of the nut 11.

Figure 5:
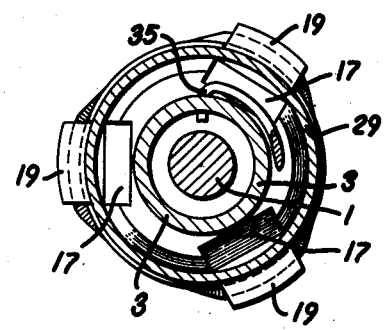
Fig. 5 is a cross-sectional view of the structure of Fig. 1 taken along the plane 5—5.

Journalled at the distal end of stem 3 is a truncated conical or tapered member 15 which has longitudinal grooves 17 evenly disposed about the periphery thereof. Two such grooves will suffice for purposes of this invention, but three grooves distributed in the manner shown in Fig. 5 have been found to be even more desirable. Still more grooves may be used if desired. Positioned in each groove, but protruding outwardly therefrom is a dog 19 which has a multi-bite gripping surface (Figs. 1 and 2) adapted to engage a pipe interior. A resilient means, such as the spring 21, is circumferentially disposed about the dogs 19 to bias them collectively inwardly on the tapered member 15. Hence the grooves 17 may be regarded as cam surfaces with the dogs 19 comprising respectively associated followers.

A headpiece 23, having an annular recess 25 for receiving an end of the pipe 27, is supported on stem 3 to permit relative movement therebetween. A cylindrical skirt 29 is preferably force-fitted into a circumferential groove 31 in the headpiece 23. The skirt 29 has an inner diameter such that it will engage the inclined surface of the tapered member 15 at the position shown in Fig. 1. It forms a shoulder at which abutting contact with the dogs 19 is maintained.

A coil spring 33 is affixed at the end 35 thereof to stem 3 and at the other end 37 to one of the connected headpiece or skirt. The spring 33 operates to bias the tapered member 15 to its inward position within skirt 29 which, of course, moves the dogs 19 radially outward to their extreme outer positions. Obviously, the combined action of springs 21 and 33 is such that at all times contact between the dogs 19 and the skirt 29 is maintained. Since the headpiece 23 is rigidly held against the pipe section 27, longitudinal movement is imparted to the tapered member 15 only. This means that the dogs 19 move only radially inwardly or outwardly with respect to the axis of the tapered member. Hence when the dogs are regarded as cam followers, it is only the cam surfaces which move with respect to the followers.

By constructing spring 33 to at all times urge the tapered member 15 toward its inward position within skirt 29, it is apparent that this spring tends to maintain the dogs biased against the pipe interior, thereby insuring against accidental disengagement of the pipe puller. Accidental disengagement of pipe pullers from pipes is a very serious inherent defect of prior art devices of this character. Obviously, such disengagements are not only damaging to materials and parts, but also could be injurious to workmen in the vicinity, especially when these men are employed in the construction of skyscrapers and other high building structures. Hence spring 33 is designed to have a biasing force greater than that of spring 21 to insure a firm gripping action for the pipe puller of the present invention.

In order that the device may be inserted within a pipe, it is only necessary that the stem 3 be moved against the force of the spring 33 with motion being limited by the cap 7 striking the headpiece 23. This relative motion between the headpiece 23 and the stem 3 is such that the spring 21 will bias dogs 19 radially inwardly as the tapered member 15 is moved in the direction away from headpiece 23. With the components in such relative positions, the assembly is then ready for insertion into the pipe to be gripped. It should be understood, of course, that the diameter of the tapered member 15 is such that when the dogs 19 are in the outer position they will occupy points on a circumference of a circle which is approximately that of the circumference of the interior of the pipe to be gripped. The assembly is placed within the pipe until the pipe end rests upon the shoulder of the annular recess 25 in the headpiece 23. This recess 25 has an outer diameter just slightly greater than that of the pipe to be gripped. The skirt 29 has an outer diameter less than that of the internal diameter of the pipe to be secured.

After the assembly has been so-inserted into the pipe, it is secured thereto by firmly pulling the handle 5 in the direction away from the pipe 27. Applying such force causes the tapered member 15 to wedge the dogs 19 simultaneously outwardly. In so doing, the dogs are caused to engage the pipe interior. To remove the pipe puller, sufficient force is applied to handle 5 to move the stem 3 and the tapered member 15 in the direction of the pipe, thus to expand spring 33 and allow dogs 19 to be biased radially inwardly, thereby permitting disengagement of the dogs from the pipe interior.

It should now be apparent that the pipe puller of the present invention is suitable for numerous applications. In the construction of dwelling houses and other buildings, or the laying of cross-country pipelines or drainage ditches, obvious needs presently exist for a pipe puller of this nature. Particularly in connection with steam installations or maintenance of steam systems, this invention permits of the insertion or extraction of pipes from wall interiors or steam insulation conduits. In connection with the foregoing it should be noted that the outside diameter of this pipe puller only slightly exceeds the diameter of pipe being handled, hence the bore or conduit diameter also need only slightly exceed the pipe diameter. As many other examples of applications of this invention to plumbing systems or pipe layouts in general are apparent, it is desired that the scope of this patent not be limited to the specific applications herein mentioned.

What is claimed is:

1. In combination in a pipe puller, a headpiece having means associated therewith to receive the end of a pipe adapted to be drawn longitudinally of the axis thereof, a hollow rigid element penetrating the headpiece and slidably supported thereby and a tubular skirt fixedly supported from the headpiece and surrounding at least a portion of the length of the slidable rigid element so that the element is adapted to move within both the headpiece and the skirt, a rotative pulling eye bolt secured within the slidable rigid element with the eye portion thereof protruding beyond one end of the rigid element and a tapered member secured to the other end and having the apex thereof located within the skirt, a plurality of pipe gripping elements adapted to grip the interior of a pipe to be pulled secured about the periphery of the tapered member and normally abutting the end of the skirt, said gripping elements being adapted to move radially inwardly and outwardly relative to the rigid element in accordance with longitudinal movement of the tapered member relative to the skirt, and resilient means interposed between the headpiece and the rigid element and contained within the skirt for normally drawing the tapered member within the skirt to displace the gripping elements in a direction of a maximum displacement from the rigid element through the skirt abutting and thereby locating longitudinally the gripping elements relative to the rigid member.

2. A pipe puller comprising a headpiece adapted to receive a pipe, a skirt secured to said headpiece and extending longitudinally therefrom, a stem penetrating said headpiece to allow relative movement therebetween and extending at least throughout the length of said skirt, a truncated conical member secured to one end of the stem to move partially within that end of the skirt member disposed away from the headpiece, a plurality of cam surfaces forming part of the periphery of said conical member, a plurality of follower members slidably mounted respectively in said cam surfaces and normally in abutting engagement with that end of the skirt disposed away from the headpiece, resilient means connected to said follower members to confine their respective movements to said cam surfaces and resilient means interposed between the headpiece and the conical member and contained within the skirt to move the cam surfaces relative to the skirt and maintain the follower members in position by the skirt so that the follower members move in a radial direction toward a maximum displacement from the axis of the conical member.

3. A pipe puller comprising a rigid member having proximal and distal ends, a handle fastened to said rigid member, a truncated conical member axially secured to said rigid member substantially at the distal end thereof and decreasing in diameter toward said proximal end, a plurality of dogs slidably mounted on said conical member, resilient means maintaining said dogs in transverse co-planar relation with respect to the axis of said conical member, said resilient means further biasing said dogs collectively radially toward the axis of said conical member, a headpiece supported on said rigid member for movement relative thereto, said headpiece having an annular recess adapted to receive an end of a pipe, a skirt integral with said headpiece and extending longitudinally therefrom to define the transverse plane through abutting engagement therewith wherein said dogs are normally maintained by said resilient means, and biasing means contained within the skirt and maintaining contact between said skirt and said dogs.

References Cited in the file of this patent

UNITED STATES PATENTS

| Number | Name | Date |
|---|---|---|
| 1,048,585 | Richards | Dec. 31, 1912 |
| 1,155,926 | Jack | Oct. 5, 1915 |
| 1,619,254 | Hart | Mar. 1, 1927 |
| 1,723,433 | Neilson | Aug. 6, 1929 |
| 2,105,885 | Hinderliter | Jan. 18, 1938 |
| 2,257,318 | Wilborn | Sept. 30, 1941 |
| 2,570,618 | Werner | Oct. 9, 1951 |
| 2,624,610 | Murphy | Jan. 6, 1953 |

FOREIGN PATENTS

| Number | Country | Date |
|---|---|---|
| 1,830 | Great Britain | Jan. 23, 1914 |